UNITED STATES PATENT OFFICE.

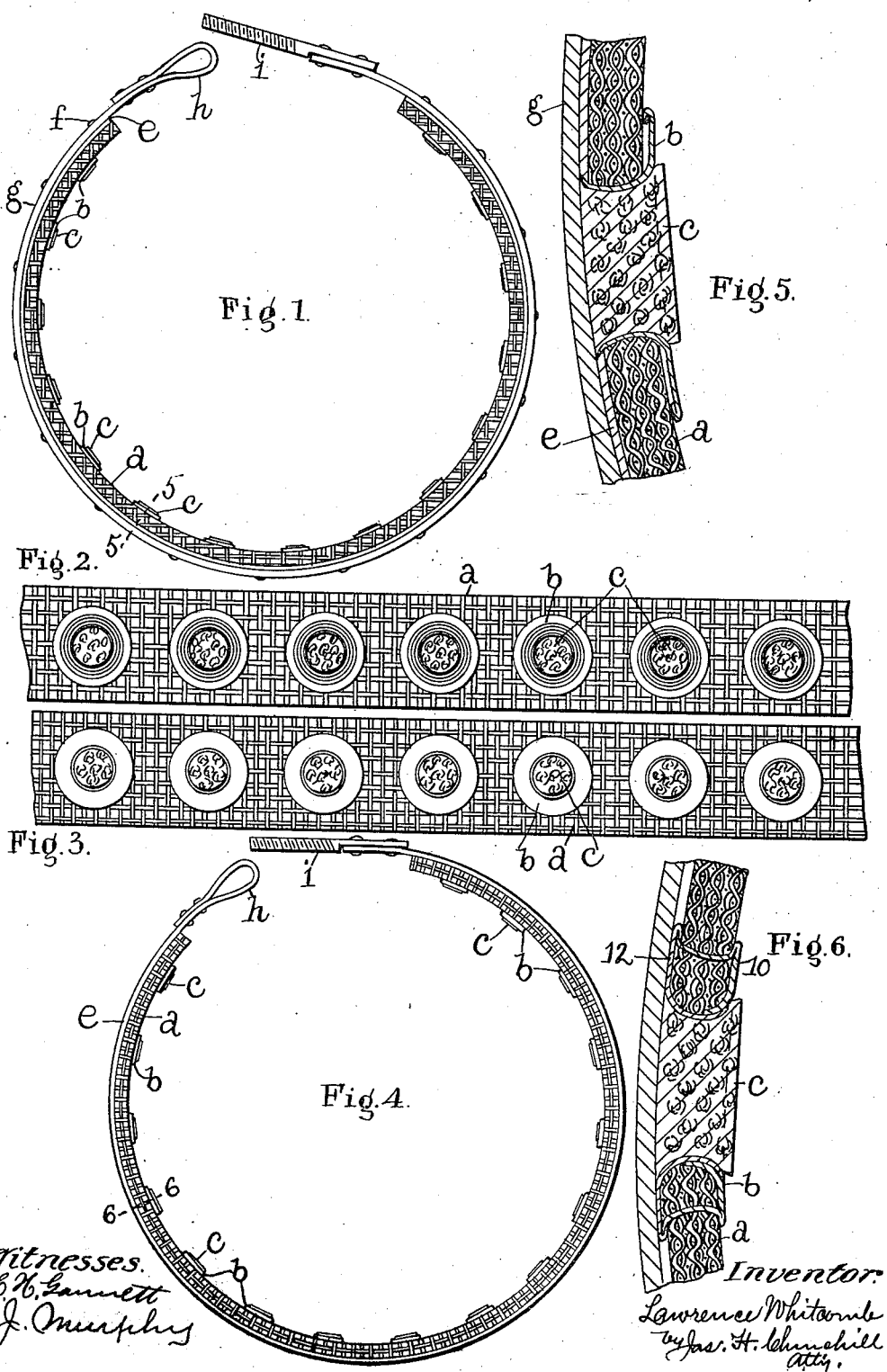

LAWRENCE WHITCOMB, OF BROOKLINE, MASSACHUSETTS, ASSIGNOR TO THE CORK INSERT COMPANY, OF BOSTON, MASSACHUSETTS, A CORPORATION OF MASSACHUSETTS.

FRICTION DEVICE.

1,081,999.  Specification of Letters Patent.  Patented Dec. 23, 1913.

Application filed December 26, 1908. Serial No. 469,364.

*To all whom it may concern:*

Be it known that I, LAWRENCE WHITCOMB, a citizen of the United States, residing in Brookline, county of Norfolk, and State of Massachusetts, have invented an Improvement in Friction Devices, of which the following description, in connection with the accompanying drawings, is a specification, like letters on the drawings representing like parts.

This invention relates to a friction device and is herein shown as embodied in a brake band or strap especially adapted among other uses, to be employed on automobiles and like vehicles.

The present invention has for its object to provide a simple and efficient brake or friction device, in which a band, strap or member of flexible non-metallic material is provided with preferably a plurality of pieces or inserts of cork, which are attached to the said band or strap by retaining devices, as will be described. These and other features of this invention will be pointed out in the claims at the end of this specification.

Figure 1 is a side elevation of a brake band embodying this invention. Figs. 2 and 3, details in developed form to be referred to. Fig. 4, a side elevation of a modified form of brake band. Fig. 5, an enlarged section on the line 5—5, Fig. 1. Fig. 6, an enlarged section on the line 6—6, Fig. 4.

Referring to the drawings, $a$ represents a band, strip or member of flexible non-metallic material, such as canvas, woven fabric, leather or the like, which is provided with a series of holes or openings formed in it for the reception of rings, eyelets or gromets $b$, which serve as retaining or holding devices for pieces or inserts $c$ of cork, which are forced in a compressed state into said eyelets and are retained therein by the expansion of the cork. The cork inserts $c$ may be substantially flush with the surface of the band or member $a$, which is adjacent to the part to be engaged, or they may project beyond said surface as represented in Figs. 1, 4, 5 and 6. The fibrous member or strip $a$ may be reinforced, if desired, by a backing strip $e$ of thin metal, such as sheet iron, tin, brass, zinc, etc., which is secured to the fibrous member by the eyelets (see Fig. 5), and the reinforced fibrous member may then be secured by rivets $f$ or in any other suitable manner to the metal band $g$ (see Fig. 1), which is provided with suitable means for attachment to the parts which operate the brake and which latter are not herein shown as they may be such as now commonly used.

In the present instance, the band $g$ is provided with a loop $h$ at one end and with a threaded rod $i$ at the other. In some instances, it may be preferred to employ the metal backing strip $e$ and the band $g$, but it is not desired to limit the invention in this respect, as said band may be omitted and the strip $e$ may be provided with the loop $h$ and threaded rod $i$ or other forms of attachments, as shown in Fig. 4. So also it may be desirable to employ an eyelet or gromet composed of two parts or members 10, 12, as shown in Fig. 6, wherein the part 12 is provided with a flange or head which engages one surface of the fabric around the opening therein, and has its shank or tubular portion inserted through the opening and expanded to engage the member 10, which engages the other surface of the fabric around the said opening, the expansion of the tubular shank portion serving to firmly clamp the member 10 to the fabric and to compress the latter about the opening therein.

When the metal backing strip $e$ is employed, the eyelet composed of a single member is used, as the rear end of the same may be expanded over the backing strip $e$, which is provided with holes or openings for this purpose, as shown in Fig. 5 and which forms a second member common to a plurality of the eyelets.

In the present invention, the metal eyelets serve a double purpose, that is, they serve to strengthen the fibrous member and prevent the destruction or weakening of the same by the formation of the holes therein, and they also afford firm walls for the corks to expand against and thereby be retained in the fibrous member.

I have herein represented the invention as embodied in an external brake band, but I do not desire to limit the invention in this respect.

I have herein described the band or flexible member as composed of non-metallic or fibrous material, and while I may prefer such a band or flexible member, I do not desire to limit my invention in this respect, as the flexible member may be made of woven wire in whole or in part, which can be used as the flexible member because of the double function of the eyelets above noted.

By reference to the drawing, it will be observed that the eyelets or gromets are made of substantially the thickness of the flexible band or member a, and have their ends overlapping the walls of the openings through which they are inserted so as to firmly clamp or grip the flexible band around the said openings on opposite sides of the band, and thereby compress the fabric about the openings through which the eyelets are inserted, which serves to strengthen the band and counteract the weakening of the fabric by the formation of the holes therein.

Claims.

1. A friction device comprising a flexible member of non-metallic material provided with holes or openings, eyelets comprising members, one member having a flange to engage one surface of the flexible member and a tubular shank, and a second member common to a plurality of eyelets and having holes which register with the holes in said flexible member and secured thereto by the expansion of the tubular shanks of the first-mentioned members, substantially as described.

2. A friction device comprising a flexible member provided with holes or openings, eyelets comprising members coöperating with said flexible member, one of said members having a flange to engage one surface of the said flexible member and a tubular shank extended through one of the holes in the said flexible member and expanded at its end, and a second member engaged by the expanded end of the said tubular shank to compress the second member against the other surface of the flexible member about the opening therein, and cork inserts in said eyelets and retained therein by the expansion of the cork, substantially as described.

In testimony whereof, I have signed my name to this specification in the presence of two subscribing witnesses.

LAWRENCE WHITCOMB.

Witnesses:
JAS. H. CHURCHILL,
J. MURPHY.